No. 763,715. PATENTED JUNE 28, 1904.
T. H. BRADY.
ROLLER CHAFE IRON.
APPLICATION FILED NOV. 2, 1903.
NO MODEL.
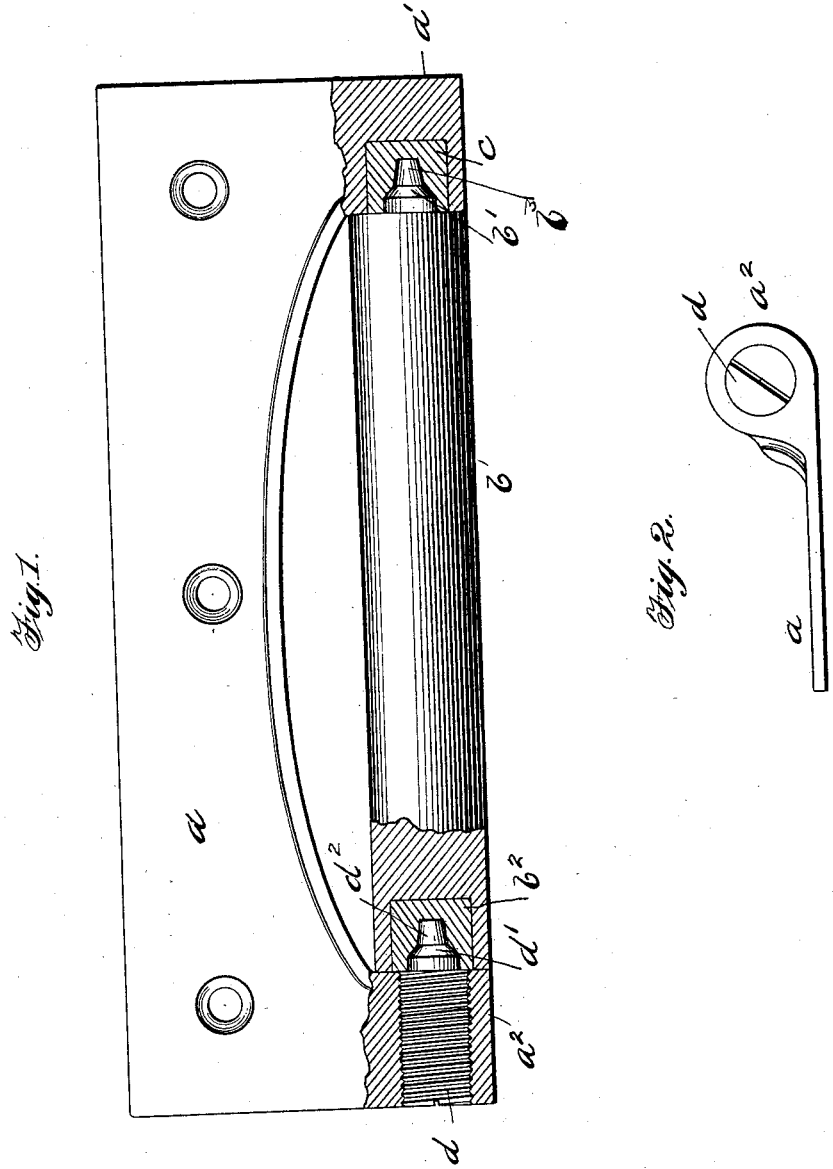

No. 763,715. Patented June 28, 1904.

UNITED STATES PATENT OFFICE.

THOMAS H. BRADY, OF NEW BRITAIN, CONNECTICUT.

ROLLER CHAFE-IRON.

SPECIFICATION forming part of Letters Patent No. 763,715, dated June 28, 1904.

Application filed November 2, 1903. Serial No. 179,549. (No model.)

*To all whom it may concern:*

Be it known that I, THOMAS H. BRADY, a citizen of the United States of America, residing at New Britain, in the county of Hartford and State of Connecticut, have invented certain new and useful Improvements in Roller Chafe-Irons, of which the following is a specification.

The object of the invention is to provide a device of the class specified having features of novelty and advantage. This is a roller chafe-iron for wagons and other wheeled vehicles.

Figure 1 is a view, partly flatwise and partly in section, of a roller chafe-iron embodying said improvement. Fig. 2 is an end view of the device.

In the accompanying drawings the letter $a$ denotes the frame or body of the device, intended to be attached and fastened to the body of the wagon or other vehicle in such a relation that the vehicle-wheel will strike against the roller of this device rather than come in contact with the vehicle-body. This frame is made of malleable iron or material of similar nature and is provided with oppositely-disposed lugs $a'$ $a^2$, between which the roll is journaled. The lug $a'$ is recessed and provided with a journal-bushing $c$, of non-rusting metal, which is free to turn in the socket.

The roll $b$ has at one end a journal-pintle having two conical bearing-surfaces $b'$ $b^3$ adjacent to one another, but of different inclinations, $b'$ being preferably inclined at an angle of forty-five degrees and $b^3$ at an angle of five degrees. This pintle is adapted to fit within a properly-shaped recess in the bushing $c$ and rotate therein. The opposite end of the roll is supported by the screw $d$, threaded through the lug $a^2$ and having a journal-pintle formed with two conical bearing-surfaces $d'$ $d^2$ of different inclinations, $d'$ being preferably inclined at an angle of forty-five degrees and $d^2$ at an angle of five degrees. This journal-pintle supports the opposite end of the roll. The roll $b$ and the screw $d$ are of steel, case-hardened. The frame and lugs thereon are not hardened.

In devices of this class I have found that the bearing where the hardened steel works on the soft metal is very liable to rust and become locked, so that the roll cannot turn, thus destroying the utility of the device. By inserting at this point a journal-bushing of non-rusting metal between the hardened steel and the soft metal the danger of the parts rusting and locking is overcome. The hardened coacting parts will not rust as readily, and the construction hereinabove described practically insures a continually-operative device.

As a modification of the above structure and carrying the idea still further I recess the end of the roll which is supported by the screw $d$ and insert therein a journal-bushing $b^2$, of non-rusting metal, which is free to turn in its socket and has a properly-shaped recess to receive the journal-pintle $d'$ $d^2$ of the screw $d$, on which it turns. This is the construction illustrated in the drawings and which may be preferred by many.

It will be seen that the roll has in reality two bearings at each end, so that if for any reason one should become locked the other will still be ready for use. It will also be seen that the shapes of the journal-pintles present features of novelty and advantage in that to a considerable extent they present particularly favorable bearing-surfaces and provide for taking up any looseness due to wear between the parts. Considering the manner of use of devices of this class the importance of this feature will be readily apparent.

The construction as a whole is one which is inexpensive to manufacture and readily assembled and taken apart.

I claim as my invention—

1. In a roller chafe-iron in combination, the frame having oppositely-disposed lugs between which the roll is journaled; said roll; a journal-bushing of non-rusting metal located in a recess in one of said lugs and free to turn therein; a journal-pintle on the roll coöperating with said bushing; and a screw threaded in the other lug and having a journal-pintle which supports the opposite end of the roll, substantially as described.

2. In combination, the frame having two oppositely-disposed lugs, the roller supported between said lugs, the journals for the roll having two adjacent conical bearing-surfaces of different inclinations, and the bushings of non-rusting metal coöperating with said journals and mounted to turn in their supporting members, substantially as described.

3. In combination, the journal-box having a socket, and a bushing of non-rusting metal located therein and free to turn; the roller having a journal-pintle provided with conical bearing-surfaces of different inclinations adapted to coöperate with said bushing; a socket in the opposite end of the roller; and the non-rusting bushing located therein free to turn; a screw having a journal-pintle adapted to enter said last-mentioned bushing and coöperate therewith; said pintle having conical bearing-surfaces of different inclinations and an internally-threaded support for said screw.

4. In combination, the frame, the journal-box having a journal-socket, the bushing of non-rusting metal located in the socket and free to turn therein, the roll having a journal-pintle at one end coöperating with said bushing, said pintle having conical bearing-surfaces of different inclinations, a socket in the opposite end of the roll, a bushing of non-rusting metal located in the socket free to turn, and a journal-pintle having bearing-surfaces of different inclinations suitably supported by the frame and coöperating with the last-named bushing, substantially as described and for the purposes set forth.

5. In combination the frame, the journal-box having a suitably-shaped journal-socket, the roll provided with a journal-pintle having two conical bearing-surfaces adjacent to one another and of different inclinations adapted to turn in said socket, a screw provided with a journal-pintle having two conical bearing-surfaces of different inclinations, and properly-shaped recesses in the end of the roll to receive said pintle, and an internally-screw-threaded support for said screw.

In testimony whereof I affix my signature in presence of two witnesses.

THOMAS H. BRADY.

Witnesses:
H. E. HART,
D. S. KREIMENDAHL.